United States Patent
Chen et al.

(10) Patent No.: US 11,797,189 B1
(45) Date of Patent: Oct. 24, 2023

(54) STORAGE SYSTEM IO THROTTLING UTILIZING A REINFORCEMENT LEARNING FRAMEWORK

(71) Applicant: Dell Products L.P., Round Rock, TX (US)

(72) Inventors: Chi Chen, Chengdu (CN); Changyue Dai, Chengdu (CN); Hailan Dong, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 17/734,309

(22) Filed: May 2, 2022

(30) Foreign Application Priority Data

Apr. 14, 2022 (CN) .......................... 202210392421.8

(51) Int. Cl.
*G06F 3/06* (2006.01)

(52) U.S. Cl.
CPC .......... *G06F 3/0613* (2013.01); *G06F 3/0653* (2013.01); *G06F 3/0679* (2013.01)

(58) Field of Classification Search
CPC ..... G06F 3/0613; G06F 3/0653; G06F 3/0679
See application file for complete search history.

(56) References Cited

U.S. PATENT DOCUMENTS

| | | | |
|---|---|---|---|
| 10,766,136 B1* | 9/2020 | Porter | G06N 3/045 |
| 2007/0098013 A1* | 5/2007 | Brown | H04L 41/00 370/466 |
| 2015/0350050 A1* | 12/2015 | Huang | H04L 41/147 703/21 |
| 2021/0255799 A1* | 8/2021 | Kale | G06N 3/049 |

OTHER PUBLICATIONS

NVM Express, NVM Express, Revision 1.3, NVM Express, May 1, 2017, 282 pages.
S. Mittal, "Deep Reinforcement Learning Tutorial," https://shivam5.github.io/drl/, Accessed Dec. 23, 2021, 15 pages.
H. Van Hasselt, "Double Q-learning," Advances in Neural Information Processing Systems, vol. 23, Jan. 2010, pp. 1-9.
R. S. Sutton et al., "Reinforcement Learning: An Introduction," Second Edition, Draft, The MIT Press, 2016, 455 pages.
C. J. C. H. Watkins et al., "Q-Learning," Machine Learning, vol. 8, No. 3, May 1, 1992, pp. 279-292.
U.S. Appl. No. 17/560,459 filed in the name of Chi Chen et al., filed Dec. 23, 2021, and entitled "Generating Parameter Values for Performance Testing Utilizing a Reinforcement Learning Framework."

* cited by examiner

*Primary Examiner* — Larry T Mackall
(74) *Attorney, Agent, or Firm* — Ryan, Mason & Lewis, LLP

(57) ABSTRACT

An apparatus comprises at least one processing device that includes a processor coupled to a memory. The at least one processing device is configured to determine a current state of a storage system, the current state of the storage system comprising two or more input-output (IO) performance metric values for the storage system, to generate, utilizing a reinforcement learning framework, an IO throttling recommendation for the storage system based at least in part on the current state of the storage system, to apply the IO throttling recommendation to the storage system, and to update the reinforcement learning framework based at least in part on a subsequent state of the storage system following the application of the IO throttling recommendation to the storage system.

20 Claims, 12 Drawing Sheets

STORAGE SYSTEM IO THROTTLING UTILIZING A REINFORCEMENT LEARNING FRAMEWORK

RELATED APPLICATION

The present application claims priority to Chinese Patent Application No. 202210392421.8, filed on Apr. 14, 2022 and entitled "Storage System IO Throttling Utilizing a Reinforcement Learning Framework," which is incorporated by reference herein in its entirety.

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. In many situations, the IO operations include bursts of write operations that are generated by one or more host devices and sent to the storage system, potentially overwhelming the limited IO queues and other resources that the storage system can allocate for the use of the individual host devices. For example, such bursts of write operations can occur when host devices run applications in-memory, and subsequently destage cached changes in batches, and under numerous other conditions. Such issues not only undermine the performance of the storage system, but in some cases can overwhelm the resources of the storage system and prevent it from completing important tasks.

SUMMARY

Illustrative embodiments of the present disclosure provide techniques for storage system IO throttling utilizing a reinforcement learning framework. These storage system IO throttling techniques can overcome the above-noted problems of conventional arrangements, providing enhanced storage system performance while also preventing bursts of IO operations from overwhelming the storage system.

In one embodiment, an apparatus comprises at least one processing device comprising a processor coupled to a memory. The at least one processing device is configured to determine a current state of a storage system, the current state of the storage system comprising two or more IO performance metric values for the storage system, to generate, utilizing a reinforcement learning framework, an IO throttling recommendation for the storage system based at least in part on the current state of the storage system, to apply the IO throttling recommendation to the storage system, and to update the reinforcement learning framework based at least in part on a subsequent state of the storage system following the application of the IO throttling recommendation to the storage system.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
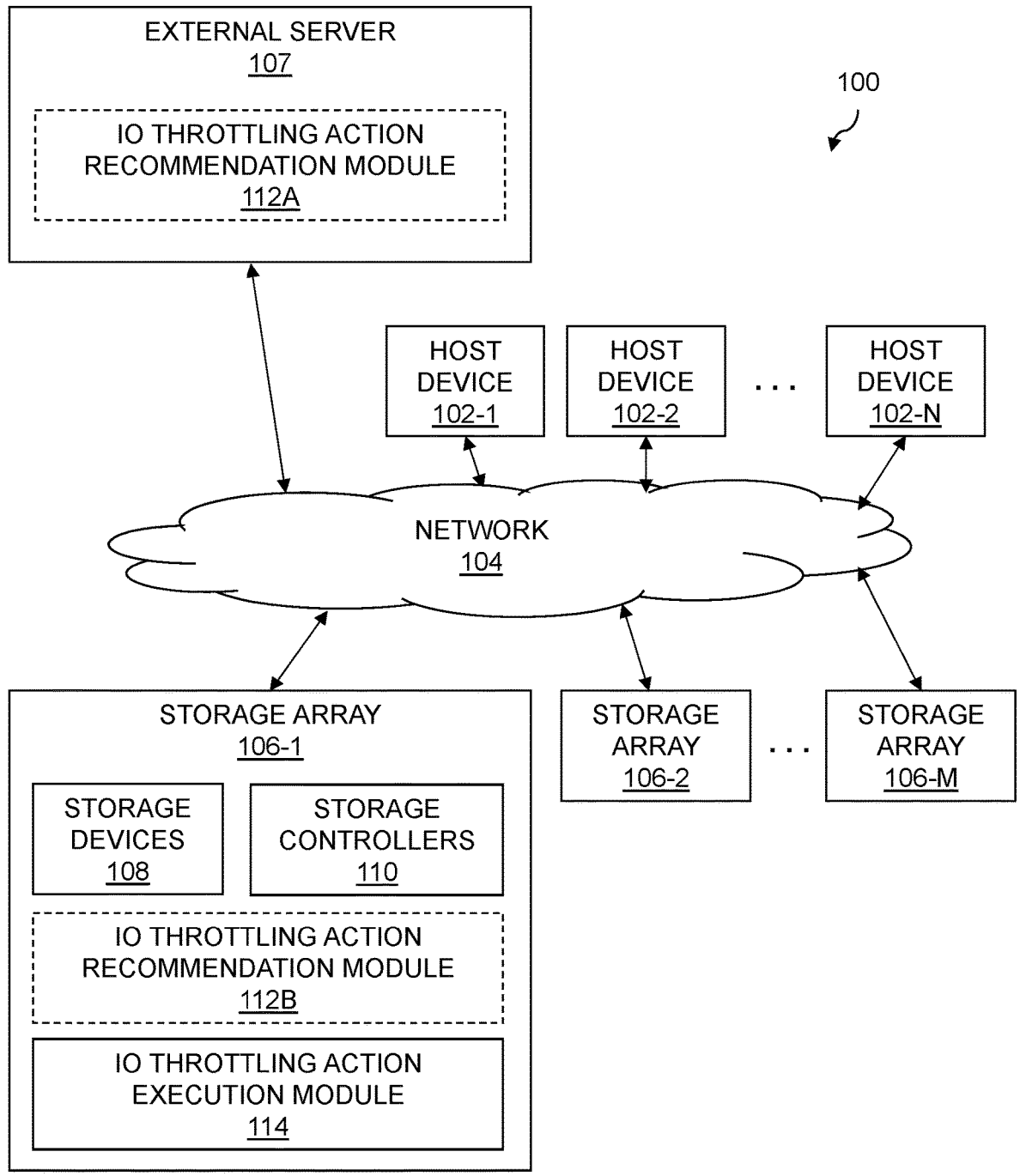
FIG. 1 is a block diagram of an information processing system configured for storage system IO throttling utilizing a reinforcement learning framework in an illustrative embodiment.

FIG. 1 shows an information processing system 100 configured in accordance with an illustrative embodiment to provide functionality for storage system IO throttling utilizing a reinforcement learning framework. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN) that includes one or more Fibre Channel (FC) switches, Ethernet switches or other types of switch fabrics, although additional or alternative networks can be used. The system 100 further comprises at least one external server 107, also coupled to the network 104.

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises a plurality of storage controllers 110 that facilitate IO processing for the storage devices 108. Each of the other storage arrays 106-2 through 106-M is assumed to be similarly configured to include storage devices 108 and storage controllers 110, as illustrated for storage array 106-1 in the figure.

The storage arrays 106, individually and collectively, may be viewed as examples of what is more generally referred to herein as a "storage system." A storage system in the present embodiment is shared by the host devices 102, and is therefore also referred to herein as a "shared storage system." In embodiments where there is only a single host device 102, the host device 102 may be configured to have exclusive use of the storage system. In some embodiments, the storage arrays 106 may be part of a storage cluster (e.g., where the storage arrays 106 may each be used to implement one or more storage nodes in a cluster storage system comprising a plurality of storage nodes interconnected by one or more networks), and the host devices 102 are assumed to submit IO operations to be processed by the storage cluster. Accordingly, each of the storage arrays 106 may represent one or more storage nodes of a storage cluster or other type of distributed storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

The storage arrays 106 illustratively comprise respective processing devices of one or more processing platforms. For example, the storage arrays 106 can each comprise one or more processing devices each having a processor and a memory, possibly implementing virtual machines and/or containers, although numerous other configurations are possible.

The storage arrays 106 can additionally or alternatively be part of cloud infrastructure, such as a cloud-based system implementing Storage-as-a-Service (STaaS) functionality.

The storage arrays 106 may be implemented on a common processing platform, or on separate processing platforms.

The storage devices 108 of the storage arrays 106 may implement logical units (LUNs) configured to store objects for users associated with the host devices 102. These objects can comprise files, blocks or other types of objects. The host devices 102 interact with the storage arrays 106 utilizing read and write commands as well as other types of commands that are transmitted over the network 104.

Such commands in some embodiments more particularly comprise, for example, Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Accordingly, numerous other command types or formats can be used in other embodiments, such as Non-Volatile Memory Express (NVMe) commands, or commands in other storage access protocols.

A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in one or more of the storage arrays 106 to include different portions of one or more physical storage devices. Storage devices 108 may therefore be viewed as comprising respective LUNs or other logical storage volumes.

The storage devices 108 of the storage arrays 106 illustratively comprise solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of storage devices 108 of storage arrays 106.

At least one of the storage controllers 110 of the storage arrays 106 is configured to implement functionality for IO throttling, utilizing IO throttling recommendations generated by a reinforcement learning framework as disclosed herein. The reinforcement learning framework is illustratively implemented by at least one of IO throttling action recommendation module 112A of external server 107 and IO throttling action recommendation module 112B of storage array 106-1. Storage array 106-1 further comprises an IO throttling action execution module 114, which carries out or otherwise executes recommended IO throttling actions provided by at least one of the IO throttling action recommendation modules 112A and 112B. Again, each of the other storage arrays 106-2 through 106-M is assumed to be configured in a manner similar to that shown for storage array 106-1 in the figure.

The IO throttling action recommendation modules 112A and 112B may be individually and collectively referred to herein as an IO throttling action recommendation module 112. The modules 112A and 112B are shown in dashed outline in FIG. 1 as the system 100 may be configured to include only one of the modules 112A and 112B or both of the modules, or a given such module may be implemented elsewhere in system 100, such as in one or more of the host devices 102.

The IO throttling recommendations are illustratively generated by at least one of the modules 112A and 112B. For example, in some embodiments, the system 100 includes only the IO throttling action recommendation module 112A implemented in external server 107, and the IO throttling action recommendation module 112B of the storage array 106-1 is eliminated. Alternatively, the IO throttling action recommendation module 112A and external server 107 can be eliminated, and the IO throttling recommendations in such an embodiment can be generated entirely within storage array 106-1 utilizing the IO throttling action recommendation module 112B.

Numerous other arrangements are possible. For example, the IO throttling action recommendation modules 112A and 112B can each implement different portions or aspects of a distributed reinforcement learning framework that generates IO throttling recommendations for one or more of the storage arrays 106 within the system 100. As another example, indicated above, an IO throttling action recommendation module such as module 112A or 112B can be implemented in each of one or more of the host devices 102, in place of or in addition to being implemented in storage array 106 and/or external server 107.

In some embodiments, a given IO throttling action recommendation module 112 is configured to determine a current state of at least a given one of the storage arrays 106, where the current state of the one or more storage arrays 106 comprises two or more IO performance metric values, such as IO operations per second (IOPS) and throughput, for the given storage array. The IO throttling action recommendation module 112 is further configured to generate, utilizing a reinforcement learning framework, an IO throttling recommendation for the given storage array based at least in part on the current state of the given storage array.

The IO throttling action execution module 114 is configured to apply the IO throttling recommendation to the given storage array, for example, by executing one or more recommended IO throttling actions. The IO throttling action recommendation module 112 is further configured to update the reinforcement learning framework based at least in part on a subsequent state of the given storage array following the application of the IO throttling recommendation to the given storage array.

Similar IO throttling operations can be performed individually for each of the storage arrays 106, utilizing respective instances of IO throttling action recommendation module 112 and IO throttling action execution module 114. Additionally or alternatively, IO throttling operations can be performed collectively across multiple ones of the storage arrays 106, for example, in arrangements in which such storage arrays each implement one or more storage nodes of a distributed storage system.

At least portions of the functionality of the IO throttling action recommendation module 112 and the IO throttling action execution module 114 may be implemented at least in part in the form of software that is stored in memory and executed by a processor.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols, such as Transmission Control Protocol (TCP).

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI or iSCSI commands, other types of storage access protocol commands and command formats can be used in other embodiments. For example, as indicated previously, some embodiments can implement IO operations utilizing command features and functionality associated with NVMe, as described in in the NVMe Specification, Revision 2.0a, July 2021, which is incorporated by reference herein. Other storage access protocols of this type that may be utilized in illustrative embodiments disclosed herein include NVMe over Fabric, also referred to as NVMeoF, and NVMe over TCP, also referred to as NVMe/TCP.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays 106 may therefore operate as a production storage array relative to another one of the storage arrays 106 which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 11 and 12.

It is to be understood that the particular set of elements shown in FIG. 1 for storage system IO throttling utilizing a reinforcement learning framework is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for storage system IO throttling utilizing a reinforcement learning framework will now be described in more detail with reference to the flow diagram of FIG. 2. It is to be understood that this particular process is only an example, and that additional or alternative processes for storage system IO throttling utilizing a reinforcement learning framework may be used in other embodiments.

In this embodiment, the process includes steps 200 through 206. These steps are assumed to be performed by at least one processing device that implements the IO throttling action recommendation module 112 and the IO throttling action execution module 114 of system 100. For example, the IO throttling action recommendation module 112 may be implemented in a first processing device that comprises an external server such as external server 107, and the IO throttling action execution module 114 may be implemented in at least a second processing device of at least one of the storage arrays 106, possibly as a distributed module with different instances thereof within each of the storage arrays 106. As another example, both of the modules 112 and 114 may be implemented on a single processing device of a given one of the storage arrays 106, or as respective distributed modules each with different instances thereof within each of the storage arrays 106.

The process as described below is generally performed with reference to a storage system, which may comprise, for example, a given one of the storage arrays 106. Similar processes may be performed individually in other ones of the storage arrays 106, or a collective implementation of the process may be performed across multiple ones of the storage arrays 106.

In step 200, a current state of the storage system is determined, where the current state of the storage system comprises two or more IO performance metric values for the storage system, such as, for example, IOPS and throughput.

In step 202, an IO throttling recommendation is generated for the storage system based at least in part on the current state of the storage system, utilizing a reinforcement learning framework as disclosed herein.

In step 204, the IO throttling recommendation is applied to the storage system. For example, in some embodiments, the storage system requests the IO throttling recommendation from an external server that implements the reinforcement learning framework, such as external server 107 of system 100. In an arrangement of this type, the storage system receives the IO throttling recommendation from the external server in response to its request, and applies the IO throttling recommendation by executing one or more IO throttling actions that are specified in the IO throttling recommendation. It is also possible that the storage system internally generates the IO throttling recommendation using an internal reinforcement learning framework, and then applies the IO throttling recommendation, again by executing one or more IO throttling actions that are specified in the IO throttling recommendation.

In step 206, the reinforcement learning framework is updated based at least in part on a subsequent state of the storage system following the application of the IO throttling recommendation to the storage system.

Steps 200 through 206 are illustratively repeated for each of a plurality of additional iterations of generating IO throttling recommendations for a current state utilizing the reinforcement learning framework, applying the IO throttling recommendations to the storage system, and updating the reinforcement learning framework based at least in part on a subsequent state of the storage system. The subsequent state for a given such iteration can become the current state for the next iteration, although other state arrangements are possible across iterations. Multiple such processes may operate in parallel with one another in order to generate IO throttling recommendations for different storage systems or portions thereof, such as different ones of the storage arrays 106.

Figure 2:
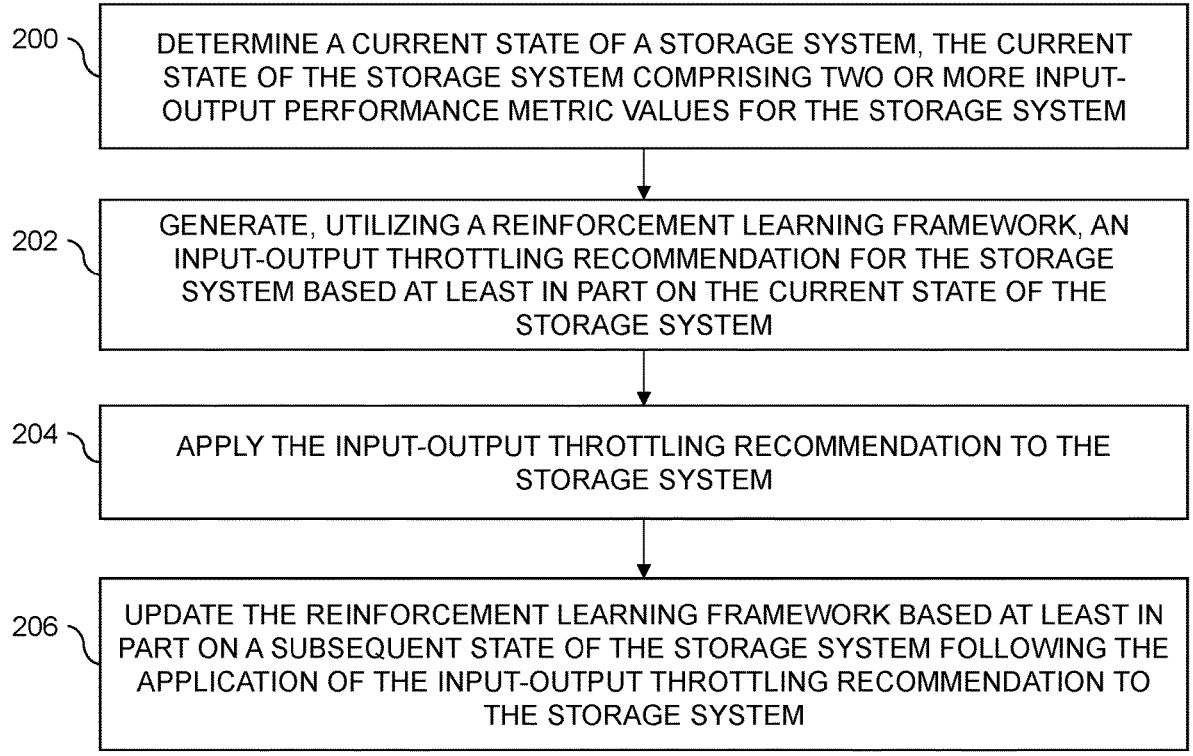
FIG. 2 is a flow diagram of an exemplary process for storage system IO throttling utilizing a reinforcement learning framework in an illustrative embodiment.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing IO throttling utilizing a reinforcement learning framework. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of IO throttling processes for respective different storage systems or different portions of one or more storage systems.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

As indicated previously, illustrative embodiments disclosed herein provide techniques for storage system IO throttling utilizing reinforcement learning. In some embodiments, reinforcement learning is used to find particular IO patterns and combinations of IO patterns which have the biggest impact on storage system performance (e.g., as measured based on various factors such as CPU or compute resource utilization, memory utilization, IO latency, etc.).

Different applications may run storage workloads having varying IO characteristics. Thus, to effectively implement IO throttling in a storage system, it is important to understand the types of storage workloads that applications or hosts utilizing the storage system are generating. Storage workloads may be described in terms of various characteristics, including but not limited to IO size, read/write ratio, random/sequential ratio, etc.

Figure 3:
FIG. 3 shows example IO patterns for different applications in illustrative embodiments.

FIG. 3 shows a table 300 illustrating various examples of applications and their associated storage workload characteristics (e.g., IO size, read/write ratio and random/sequential ratio). Such applications include: web file server, web server log, operating system (OS) paging, exchange server, workstation, media streaming, online transaction processing (OLTP) data, and OLTP log. The web file server application, for example, may have an IO size of 4 kilobytes (KB), 8 KB or 64 KB, with a read/write ratio of 95% read and 5% write, and a random/sequential ratio of 75% random and 25% sequential. As another example, the OLTP logging application may have an IO size of 512 bytes (B) to 64 KB, a read/write ratio of 100% write, and a random/sequential ratio of 100% random.

It should be noted that the particular applications and their associated storage workload characteristics shown in the table 300 of FIG. 3 are presented by way of example only, and that in other embodiments there may be various other types of applications that utilize storage systems, or the applications listed in the table 300 of FIG. 3 may have different values for their associated storage workload characteristics.

In a storage system, an IO path may include one or more caches, internal buffers, pools, redundant arrays of independent disks (RAIDs), and backend storage drive IO. Different IO patterns, and different combinations of IO patterns, will have different impacts on overall storage system performance. Random and small IO requests may lead to storage system performance degradation. IO request size may influence storage system performance throughput (e.g., generally, the larger the IO size the higher the storage bandwidth). Writes are more expensive than reads, as the storage system needs to determine where to put new chunks of data and, once such a decision is made as to where to place the data, the write itself is time consuming due to factors such as RAID write penalties. Different combinations of IO patterns can also influence storage system performance throughput, and may be dependent on the storage system's hardware and software configuration.

In some embodiments, IO throttling provides a mechanism to control the amount of resources that are used when the storage system is processing IOs on supported objects. For example, a given storage system is illustratively configured to include multiple throttling functions within an IO path to help balance the performance of the system to avoid congestion issues. When the storage system becomes saturated with various IO workloads, the IO throttling will delay handling some IO loads to make sure the system resources are not overwhelmed and can still provide services to critical tasks.

As noted above, different IO patterns and combinations of IO patterns, such as those shown in FIG. 3, will have different storage system performance impacts, including different impacts on IO throughput and latency.

Techniques which simply throttle the IO requests without leveraging the storage system performance impacts of the different IO patterns and combinations of IO patterns can undermine storage system performance.

Illustrative embodiments disclosed herein achieve improved IO throttling efficiency at least in part by leveraging the system performance impact of the IO patterns and combinations of IO patterns in a reinforcement learning framework.

Such a reinforcement learning framework is illustratively configured to learn in a trial-and-error manner which storage system IO patterns and combinations of IO patterns have the greatest impact on system performance measured in terms of parameters such as CPU and memory utilization and IO throughput and latency. The reinforcement learning framework illustratively generates recommended IO throttling actions for the storage system, and continually updates its learning over time, thereby achieving further IO throttling efficiencies and associated performance enhancements in terms of storage system IO throughput and latency.

Illustrative embodiments herein therefore provide significant advantages relative to techniques that simply throttle IO requests, through the use of a reinforcement learning framework configured to learn the performance impacts associated with IO patterns and combinations of IO patterns.

Moreover, such embodiments do not require human intervention, and instead can provide an end-to-end autonomous IO throttling solution which continually learns an optimal IO throttling policy.

In some embodiments, an end-to-end autonomous IO throttling solution is based on a reinforcement learning framework. Reinforcement learning (RL) is a class of learning problems framed in the context of planning on a Markov Decision Process (MDP), in which agents train a model by interacting with an environment (e.g., a storage system) and where the agents receive rewards from IO throttling actions performed correctly (e.g., which meet or further one or more designated goals for storage system performance) and penalties from IO throttling actions performed incorrectly (e.g., which do not meet or further the one or more designated goals for storage system performance). After multiple trial-and-error training rounds, the autonomous IO throttling solution will know how to reach the system performance target (e.g., the one or more designated goals for storage system performance) without any need for explicit involvement of an administrator or other human user.

Figure 4:
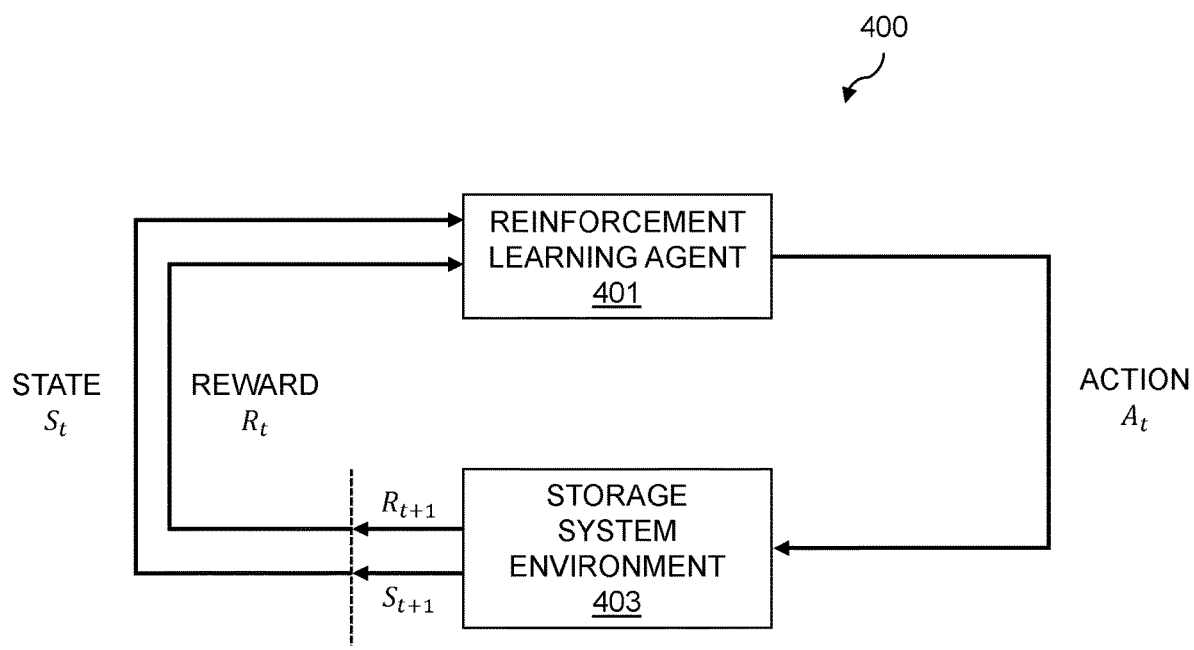
FIG. 4 shows a reinforcement learning framework for generating IO throttling recommendations for a storage system in an illustrative embodiment.

FIG. 4 illustrates a reinforcement learning framework 400, which includes a reinforcement learning agent 401 and a storage system environment 403. As shown, the reinforcement learning agent 401 receives or observes a state $S_t$ at a time t. The reinforcement learning agent 401 selects an action $A_t$ based on its action selection policy, and transitions to a next state $S_{t+1}$ at a time t+1. The reinforcement learning agent 401 receives a reward $R_{t+1}$ at a time t+1. The reinforcement learning agent 401 leverages a reinforcement learning algorithm, which may include but is not limited to a Q-learning algorithm, a Deep Q-Networks (DQN) algorithm, a Double DQN (DDQN) algorithm, etc., to update an action-value function $Q(S_i, A_i)$.

An example Q-learning algorithm comprises a value-based reinforcement learning algorithm configured to determine an optimal action-selection policy using a Q function. DQN approximates a state-value function in a Q-learning framework with a neural network. As an extension of Q-learning, DQN utilizes a replay buffer and a target network, both of which help improve algorithm stability. DDQN is an improvement for DQN. In DQN, the target Q-network selects and evaluates every action, potentially resulting in an overestimation of Q value. To resolve this issue, DDQN uses the Q-network to choose the action and uses the target Q-network to evaluate the action. Again, these are just examples, and other types of reinforcement learning algorithms can be used.

The action-value function defines a long-term value of taking an action $A_i$ in a state $S_i$, as will be described in further detail below. Over time, the reinforcement learning agent 401 learns to pursue actions that lead to the greatest cumulative reward at any state.

Techniques for defining states, actions and rewards will now be described. A state space S includes a set of possible state values. A state $S_t \in S$ is a vector of values from $S=\{S_1, S_2, \ldots, S_n\}$ at time step t. In this example, the state $S_t$ illustratively represents storage system information (denoted storage_system_info$_t$), runtime performance information (denoted runtime_performance_info$_t$) and IO pattern combinations (denoted IO_pattern_combination_info$_t$) at time step t. More particularly, $S_t$ is illustratively given by the following:

{storage_system_info$_t$, runtime_performance_info$_t$, IO_pattern_combination_info$_t$}

The storage system information, runtime performance information and IO pattern combinations in some embodiments illustratively include at least a portion of the following, which represents a more detailed example of $S_t$:

<Storage System Info>
System Hardware: <hardware>
System Platform: <platform>
Drive Information: <Drive>
average_physical_space_usage=40(percentage)
<Runtime Performance Info>
average_total_IOPS=60(K)
average_throughput=250 (MB/S)
average_CPU_Util=70 (percentage)
average_Latency=2 (ms)
<IO Pattern Combination Info>
average_IO_size=8 (KB)
Read/write ratio=95(Read percentage)
Random/Sequential ratio=75(Random percentage)

It is to be appreciated, however, that different configurations of $S_t$ and additional or alternative components can be used in other embodiments.

The action space will now be described. The reinforcement learning agent 401, as noted above, observes the current state $S_t$ at each time step t and takes an action $A_t$. In some embodiments, the action $A_t$ involves modifying a single throttling value (e.g., increasing or decreasing IOPS, or increasing or decreasing throughput) based at least in part on an IO throttling policy.

Figure 5:
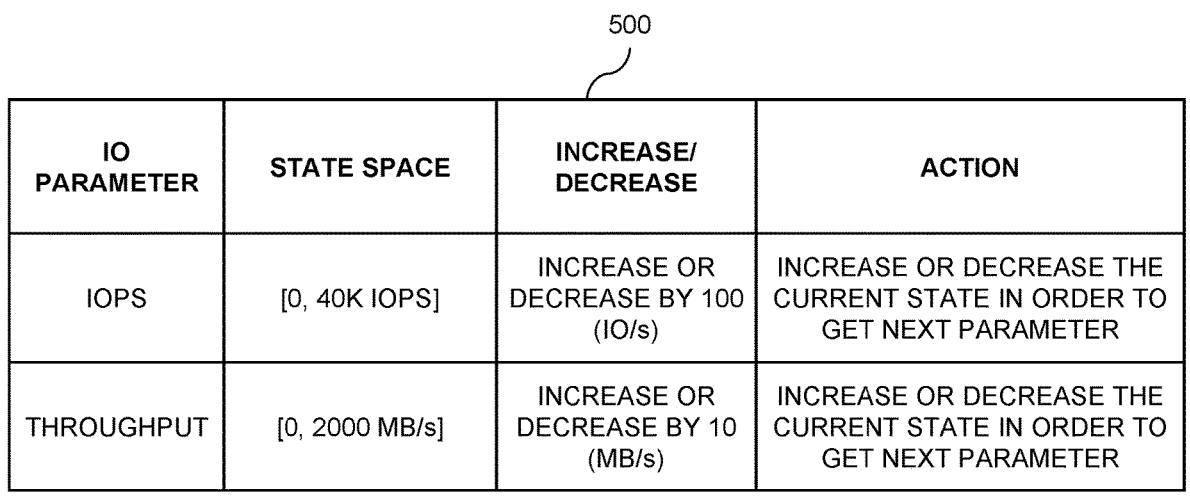
FIG. 5 shows an example IO throttling policy for a storage system in an illustrative embodiment.

FIG. 5 shows an example IO throttling policy in an illustrative embodiment. In this example, the IO throttling policy shown in table 500 includes two IO parameters—IOPS and throughput, although additional or alternative parameters can be used in other embodiments. The table 500 includes, for each such IO parameter, an associated state space, applicable increase/decrease values, and corresponding actions for that IO parameter.

Figure 6:
FIG. 6 shows an example action space for the IO throttling policy of FIG. 5 in an illustrative embodiment.

The IO throttling policy illustrated in FIG. 5 has a total of five possible actions, which are shown in table 600 of FIG. 6. Additional or alternative actions and associated IO throttling policies may be used in other embodiments.

The reward space will now be described. A reward function R is defined to guide the reinforcement learning agent 401 towards good solutions for a given objective. For example, the objective for the agent in some embodiments is to achieve the best possible storage system performance (e.g., minimizing latency and maximizing throughput) with throttling of minimal IO loads. The reward $R_{t+1}$ may thus be defined as:

$$R_{t+1} = W_1 * \left( \frac{-\text{Latency}_{average} + \text{Latency}_{initial}}{\text{Latency}_{initial}} \right) +$$

-continued $$W_2 * \left( \frac{\text{Throughput}_{average} - \text{Throughput}_{initial}}{\text{Throughput}_{initial}} \right)$$

where an initial performance of the storage system has latency given by Latency$_{initial}$ and throughput given by Throughput$_{initial}$, and $W_1$ and $W_2$ denote weights applied to the respective latency and throughput parameters. Such weights can be adjusted depending upon the relative importance of latency and throughput within a given storage system implementation, and are illustratively set to 0.5 and 0.5 to represent an equal importance of these two example parameters. Also, additional or alternative key performance indicators (KPIs) or other parameters can be used to define the reward function in other embodiments.

As one possible example of a reward function that utilizes additional KPIs other than latency and throughput, the following reward function utilizes a combination of latency, throughput, CPU utilization and memory utilization, weighted by respective weights $W_1$, $W_2$, $W_3$ and $W_4$:

$$R_{t+1} = W_1 * \left( \frac{-\text{Latency}_{average} + \text{Latency}_{initial}}{\text{Latency}_{initial}} \right) +$$

$$W_2 * \left( \frac{\text{Throughput}_{average} - \text{Throughput}_{initial}}{\text{Throughput}_{initial}} \right) +$$

$$W_3 * \left( \frac{-CPU_{average} + CPU_{initial}}{CPU_{initial}} \right) + W_4 * \left( \frac{-\text{Memory}_{average} + \text{Memory}_{initial}}{\text{Memory}_{initial}} \right)$$

Again, these are only example reward functions, and other types and configurations of reward functions can be used in other embodiments.

The reinforcement learning agent 401 tunes the IO throttling setting of the storage system utilizing the IO throttling policy and associated actions set forth in FIGS. 5 and 6. At time step t, Latency$_{average}$ is the average latency of the storage system and Throughput$_{average}$ is the average throughput of the storage system. In the example reward function, the lower the latency and the higher the throughput observed, compared with the initial system performance, the greater the reward that will be generated at time step t.

Figure 7:
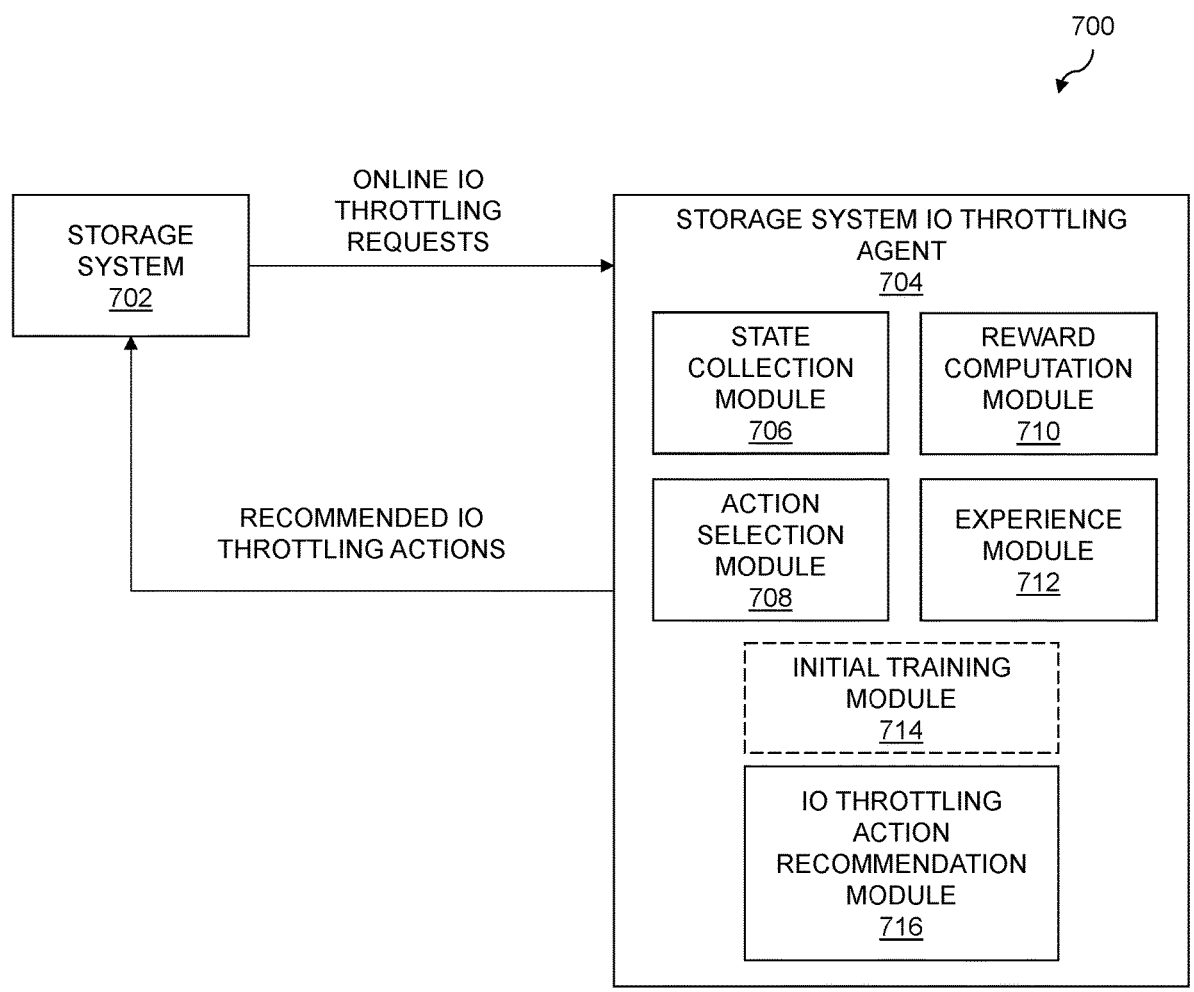
FIG. 7 is a block diagram of an information processing system in which a storage system obtains IO throttling recommendations from an external server in an illustrative embodiment.

FIG. 7 shows an information processing system 700 in which a storage system 702 interacts with a storage system IO throttling agent 704 that is implemented externally from the storage system 702. For example, the storage system IO throttling agent 704 may be implemented at least in part on one or more external servers of the system 700 and/or on one or more host devices of the system 700. In other embodiments, the storage system IO throttling agent 704 can be implemented internally to the storage system 702.

The storage system 702 in this embodiment issues IO throttling requests to the storage system IO throttling agent 704, which utilizes a reinforcement learning framework of the type previously described to generate recommended IO throttling actions which are returned to the storage system 702 for execution. The storage system IO throttling agent 704 is illustratively implemented as an autonomous agent that automates storage system monitoring, learning and decision making in relation to IO throttling in order to achieve the best storage system performance. It may be deployed as a service accessible to the storage system 702, for example, via one or more external servers as noted above.

The storage system IO throttling agent 704 implements a number of functional modules which are utilized in implementing a reinforcement learning framework that generates the recommended IO throttling actions which are provided back to the requesting storage system 702. Such functional modules include state collection module 706, action selection module 708, reward computation module 710, experience module 712, initial training module 714 and IO throttling action recommendation module 716.

The state collection module 706 obtains a current state of the storage system 702 in conjunction with receipt of an IO throttling request. The state illustratively includes static and runtime information such as storage system information, runtime performance information and IO pattern combinations, as previously described.

The action selection module 708 observes the current state (e.g., $S_t$) and provides a recommended IO throttling action $A_t$ to the storage system 702.

The reward computation module 710 calculates the reward $R_{t+1}$ for performing action $A_t$ selected for state $S_t$ based on the specified storage system performance goal, which is illustratively achieving the best storage system performance (e.g., providing minimal IO latency and maximal IO throughput) while throttling minimal IO loads.

The experience module 712 uses a reinforcement learning algorithm to update the experience according to the current state, action, reward and next state. The experience $Q(S_i, A_i)$ is a mapping between the storage system environment states and actions that maximize a long-term reward. Such experience in some embodiments is also referred to herein as an "experience network."

The initial training module 714 gathers some initial IO throttling experience to build an initial experience model which can be leveraged directly for upcoming new IO throttling tasks. With the initial training module 714, the storage system IO throttling agent 704 can find the "good" IO patterns and combinations of IO patterns with fewer trials, since upcoming tasks can leverage existing learned experience. It should be noted that use of the initial training module 714 is optional, and may be deployed as an advanced service in some embodiments. Such an "optional" designation should not be viewed as an indication that other components in this and other embodiments are required.

The IO throttling action recommendation module 716 illustratively sends a given recommended IO throttling action to the storage system 702 in response to a given IO throttling request received therefrom.

Figure 8:
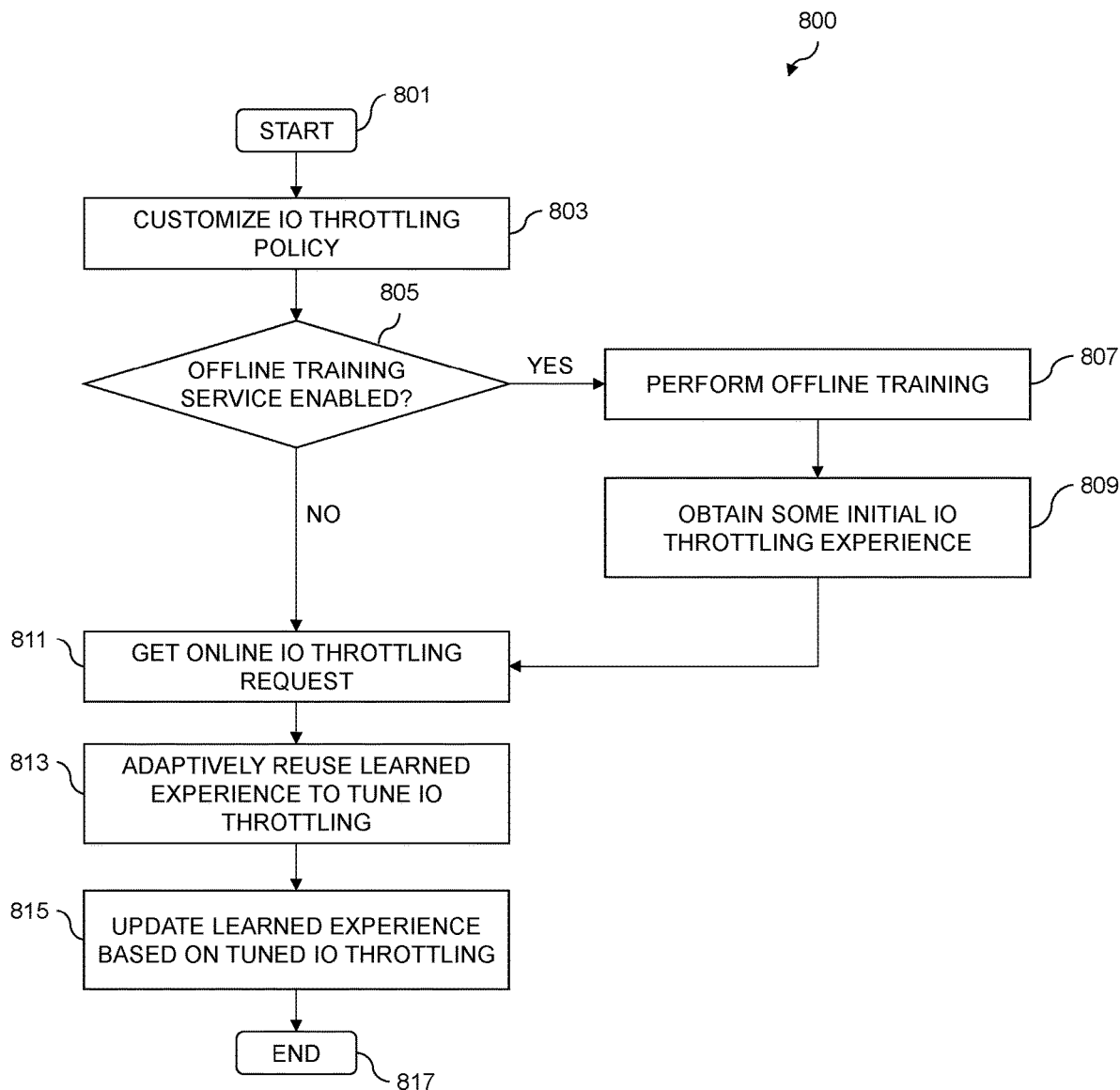
FIG. 8 is a flow diagram of another exemplary process for storage system IO throttling utilizing a reinforcement learning framework in an illustrative embodiment.

FIG. 8 shows a process flow 800 for the storage system IO throttling agent 704 to generate IO throttling action recommendations. The process flow 800 starts as indicated at step 801, and includes steps 803 through 815 before ending at step 817.

In step 803, an IO throttling policy is customized for the particular storage system implementation. An example IO throttling policy was previously described in conjunction with FIG. 5, but additional or alternative policies can be used, and can be individually customized for particular storage systems that are subjected to autonomous IO throttling using a reinforcement learning framework as disclosed herein.

In step 805, a determination is made as to whether or not an offline training service is enabled (e.g., whether the functionality of the initial training module 714 is enabled). If the offline training service is enabled, the process moves to step 807, and otherwise moves to step 811 as indicated.

In step 807, the initial training module 714 initiates performance of offline training.

In step 809, the offline training initiated in step 807 is utilized to obtain some initial IO throttling experience, which is then used to guide online training to hit the system performance goals quicker (e.g., with fewer iterations). The offline training illustratively includes the following training steps:

T1. The state collection module 706 monitors the storage system state, and once it detects a significant change in IOPS and throughput, it obtains an initial state $S_t$ and the new state $S_{t+1}$ as previously described.

T2. The action selection module 708 determines an action $A_t$ based on the IO throttling policy and its associated set of available actions, as previously described in conjunction with the examples of FIGS. 5 and 6.

T3. The reward computation module 710 calculates the reward $R_{t+1}$ in the manner previously described.

T4. The experience module 712 utilizes a reinforcement learning algorithm and records of ($S_t$, $A_t$, $R_{t+1}$, $S_{t+1}$) to update IO throttling experience $Q(S_i, A_i)$ in order to approximate an optimal IO throttling policy. Examples of reinforcement algorithms that can be used include but are not limited to Q-learning algorithms, DQN algorithms, DDQN algorithms, etc.

The records of ($S_t$, $A_t$, $R_{t+1}$, $S_{t+1}$) are examples of what are more generally referred to herein as "state-action records." Other types and configurations of state-action records can be used in other embodiments. For example, in some embodiments, such records can include a reward $R_t$ in place of or in addition to a reward $R_{t+1}$.

The experience $Q(S_i, A_i)$ is an example action-value mapping which illustratively represents the long-term value of action $A_t$ at any state $S_i$. The long-term value refers to the possibility of hitting the desired storage system performance goal in the future after taking action $A_t$, even if the goal is not achieved immediately after taking this action.

Figure 9:
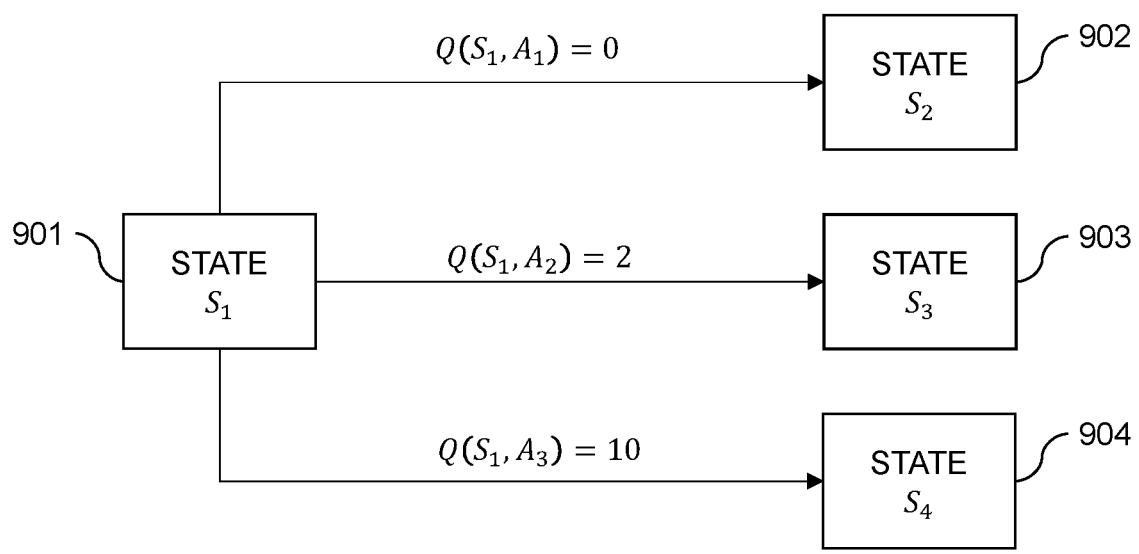
FIG. 9 shows an example action-value mapping for long-term values of actions in an illustrative embodiment.

Referring now to FIG. 9, an example action-value mapping for long-term values of actions is shown. This action-value mapping shows various actions that may be taken from a state $S_1$ 901. At state $S_1$ 901, after taking a first action $A_1$ a state $S_2$ 902 is reached. From state $S_2$ 902, there is no possibility of hitting the performance goal (from the experience learned thus far). Thus, $Q(S_1, A_1)=0$, which means the first action $A_1$ does not have long-term value. At state $S_1$ 901, after taking a second action $A_2$ a state $S_3$ 903 is reached. In state $S_3$ 903 the performance goal is not achieved, but upcoming actions starting from the state $S_3$ 903 do eventually lead to achieving the performance goal. Thus, the second action $A_2$ has value for the long term instead of the short term, and $Q(S_1, A_2)=2$. At state $S_1$ 901, after taking a third action $A_3$ the state $S_4$ 904 is reached where the performance goal is achieved immediately, and thus $Q(S_1, A_3)=10$. The experience $Q(S_i, A_i)$ will get more and more accurate with every training iteration. If enough training is performed, it will converge and represent a true Q-value.

Returning to FIG. 8, in step 811, the storage system IO throttling agent 704 receives an IO throttling request from the storage system 702. Such a request is also referred to herein as an "online" request, as it may be received from the storage system 702 while the system is experiencing conditions that appear to require IO throttling. For example, if the storage system 702 experiences at least a specified threshold amount of performance degradation, the online request can be triggered automatically.

Step 811 may be performed following steps 807 and 809, or following step 803 if the result of the step 805 determination is negative. The IO throttling request received from the storage system 702 illustratively includes information characterizing the current state $S_t$ of the storage system 702, such as the above-described state information:

{storage_system_info$_t$, runtime_performance_info$_t$, IO_pattern_combination_info$_t$}, although additional or alternative types of state information can be used in other embodiments. Such information can illustratively be extracted from the online request by the state collection module 706.

In step 813, the storage system IO throttling agent 704 adaptively reuses learned knowledge or experience to tune IO throttling to achieve the system performance goal.

In some embodiments, there are multiple distinct modes for adaptively reusing the experience. The modes include an exploitation mode, an exploration mode, and a mode that utilizes a combination of exploitation and exploration. Selection between the modes is illustratively controlled by an exploitation and exploration tradeoff parameter $\varepsilon(t)$, which can take on values from 0 to 1, with a value of 0 indicating the exploitation mode, a value of 1 indicating the exploration mode, and values between 0 and 1 indicating different combinations of exploration and exploitation.

The value of the exploitation and exploration tradeoff parameter $\varepsilon(t)$ is illustratively set at a given time step t, and varies over time. For example, it may decrease over time as more experience is obtained. At time step t, the storage system IO throttling agent 704 will with probability $\varepsilon(t)$ select a random action from the action space, and otherwise selects the best action (e.g., with the highest $Q(S_i, A_i)$ value) from the action space. Accordingly, after gaining enough experience, the storage system IO throttling agent 704 tends to leverage the learned experience via exploitation, while before having enough experience, the storage system IO throttling agent 704 tends to select random actions via exploration, where the value of $\varepsilon(t)$ at time step t denotes the probability of selecting a random action for that time step.

The selected IO throttling action $A_t$ for state $S_t$ is provided to the storage system 702 as an IO throttling action recommendation for execution, and a corresponding record of ($S_t$, $A_t$, $R_{t+1}$, $S_{t+1}$) is determined for the iteration.

In step 815, the experience module 712 keeps using the reinforcement learning algorithm to record additional ($S_t$, $A_t$, $R_{t+1}$, $S_{t+1}$) records and to update $Q(S_i, A_i)$. In this way, the learned experience keeps updating over time. Thus, over time better recommendations for IO throttling actions are provided which improve storage system performance. The process flow 800 then ends in step 817. For example, it can terminate responsive to the storage system obtaining an acceptable performance level relative to its performance goal, or upon reaching a specified maximum number of tuning attempts (e.g., three attempts). Such tuning attempts are considered examples of what are more generally referred to herein as "iterations" and different types and arrangements of iterations can be used in other embodiments.

Regardless of whether or not the performance goal is achieved in a given iteration, the additional experience obtained with each iteration will enhance the future decision-making ability of the storage system IO throttling agent 704.

Figure 10:
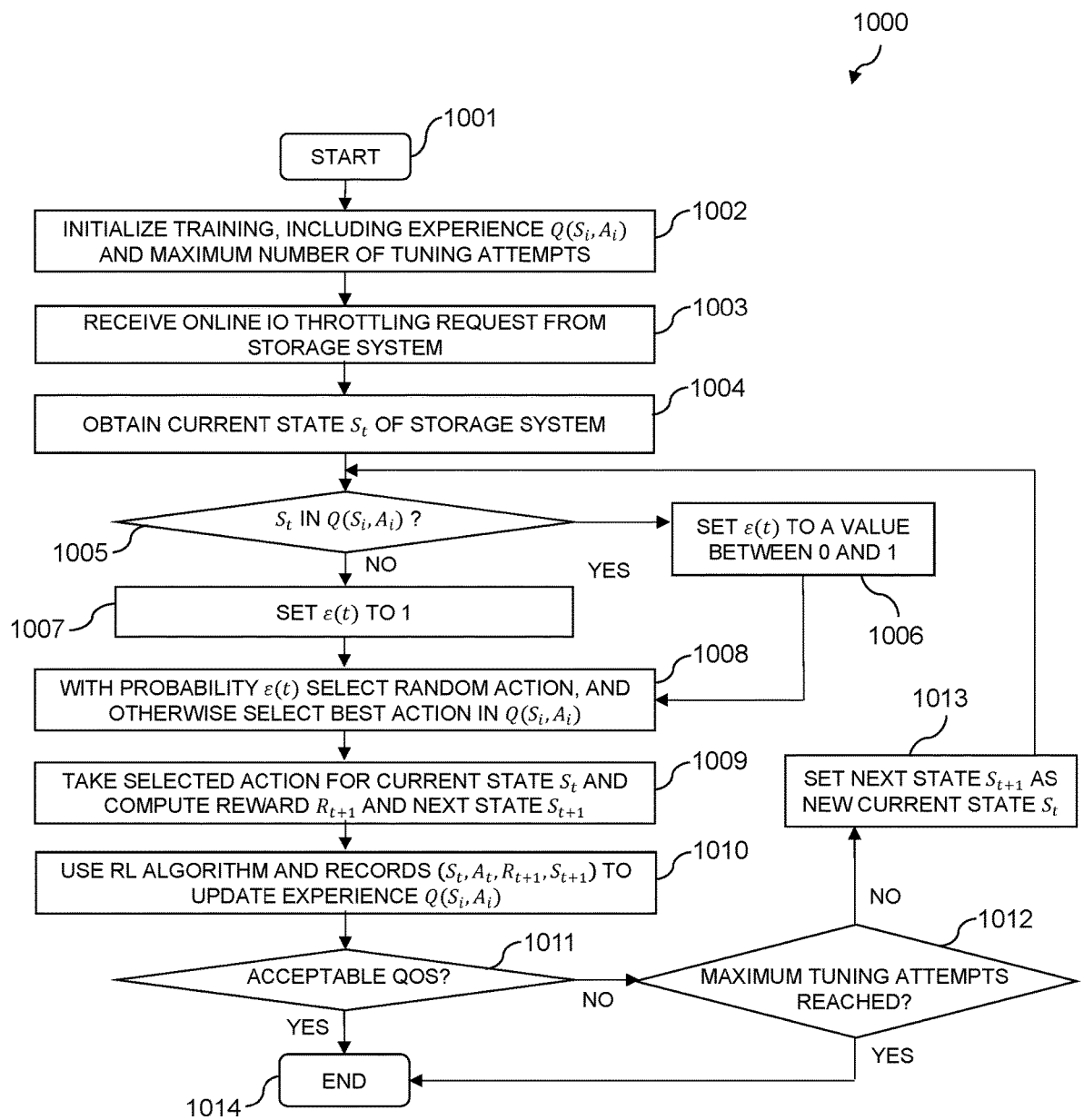
FIG. 10 is a flow diagram showing a more detailed view of a portion of the exemplary process of FIG. 8 in an illustrative embodiment.

FIG. 10 shows a more detailed view of an example implementation of a portion of the FIG. 8 process, the portion including at least steps 811 to 815 of the FIG. 8 process. The FIG. 10 flow diagram illustrates a process flow 1000 that starts as indicated at step 1001, and includes steps 1002 through 1013 before ending at step 1014.

In step 1002, training is initialized, including initializing experience $Q(S_i, A_i)$ and a maximum number of tuning attempts.

In step 1003, an online IO throttling request is received from the storage system 702.

In step 1004, the current state $S_t$ of the storage system 702 is obtained.

In step 1005, a determination is made as to whether or not the state $S_t$ exists in the experience $Q(S_i, A_i)$. If the determination is affirmative, the process moves to step 1006, and otherwise moves to step 1007 as indicated.

In step 1006, which is reached if the state $S_t$ exists in the experience $Q(S_i, A_i)$, the exploitation and exploration tradeoff parameter $\varepsilon(t)$ is set to a value between 0 and 1 that illustratively decreases over multiple throttling attempts. The process then moves to step 1008 as indicated.

In step 1007, which is reached if the state $S_t$ does not exist in the experience $Q(S_i, A_i)$, the exploitation and exploration tradeoff parameter £(t) is set to a value of 1, meaning that exploration will be performed by randomly selecting an action to take for the state $S_t$.

In step 1008, based on the state $S_t$, with probability $\varepsilon(t)$, a random action is selected from the action space, and otherwise the best action, having the highest $Q(S_i, A_i)$ observed thus far, is selected.

In step 1009, the selected IO throttling action $A_t$ is provided to the storage system 702 for execution, and reward $R_{t+1}$ and next state $S_{t+1}$ are determined.

In step 1010, the reinforcement learning algorithm and records of $(S_t, A_t, R_{t+1}, S_{t+1})$ are used to update $Q(S_i, A_i)$ in order to approximate the optimal IO throttling policy.

In step 1011, a determination is made as to whether or not an acceptable system performance in terms of a Quality of Service (QoS) level is obtained. If the determination is affirmative, the process ends at step 1014, and otherwise moves to step 1012 as indicated.

In step 1012, a determination is made as to whether or not the specified maximum number of tuning attempts has been reached. If the determination is affirmative, the process ends at step 1014, and otherwise moves to step 1013 as indicated.

In step 1013, the next state $S_{t+1}$ is set as the new current state $S_t$, and the process returns to step 1005 for another tuning attempt. The process then proceeds through steps 1005 through 1011 or 1012 as previously described.

As in other flow diagrams provided herein, the particular steps of the flow diagrams of FIGS. 8 and 10 are presented in sequential order for clarity and simplicity of illustration only, and certain steps can at least partially overlap with other steps. Additional or alternative steps can be used in other embodiments.

It is also to be appreciated that the particular functionality, features and advantages described above and elsewhere herein are associated with particular illustrative embodiments and need not be present in other embodiments.

Illustrative embodiments of processing platforms utilized to implement functionality for storage system IO throttling utilizing a reinforcement learning framework will now be described in greater detail with reference to FIGS. 11 and 12. Although described in the context of system 100, these platforms may also be used to implement at least portions of other information processing systems in other embodiments.

Figure 11:
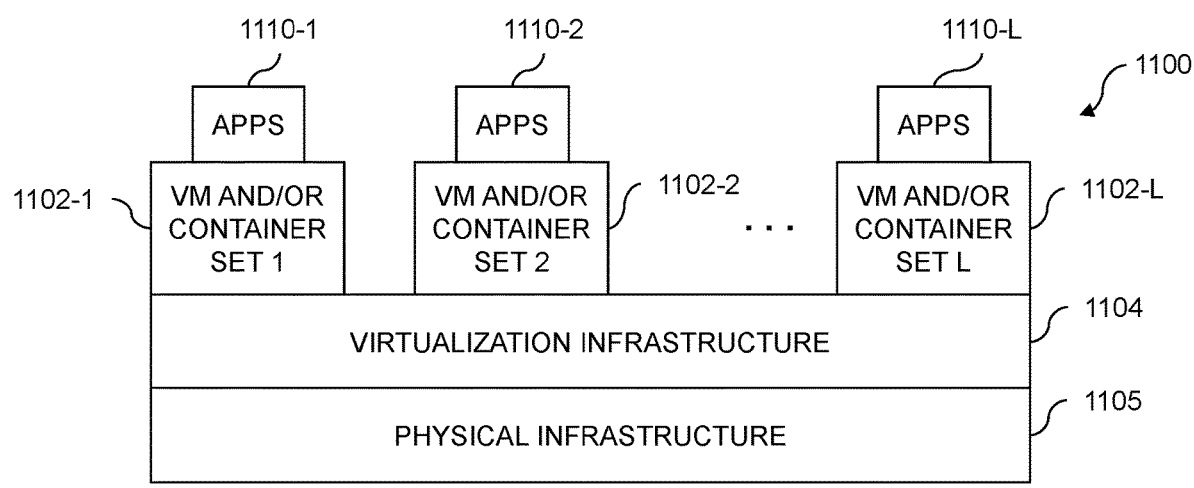
FIGS. 11 and 12 show examples of processing platforms that may be utilized to implement at least a portion of an information processing system in illustrative embodiments.
Figure 12:
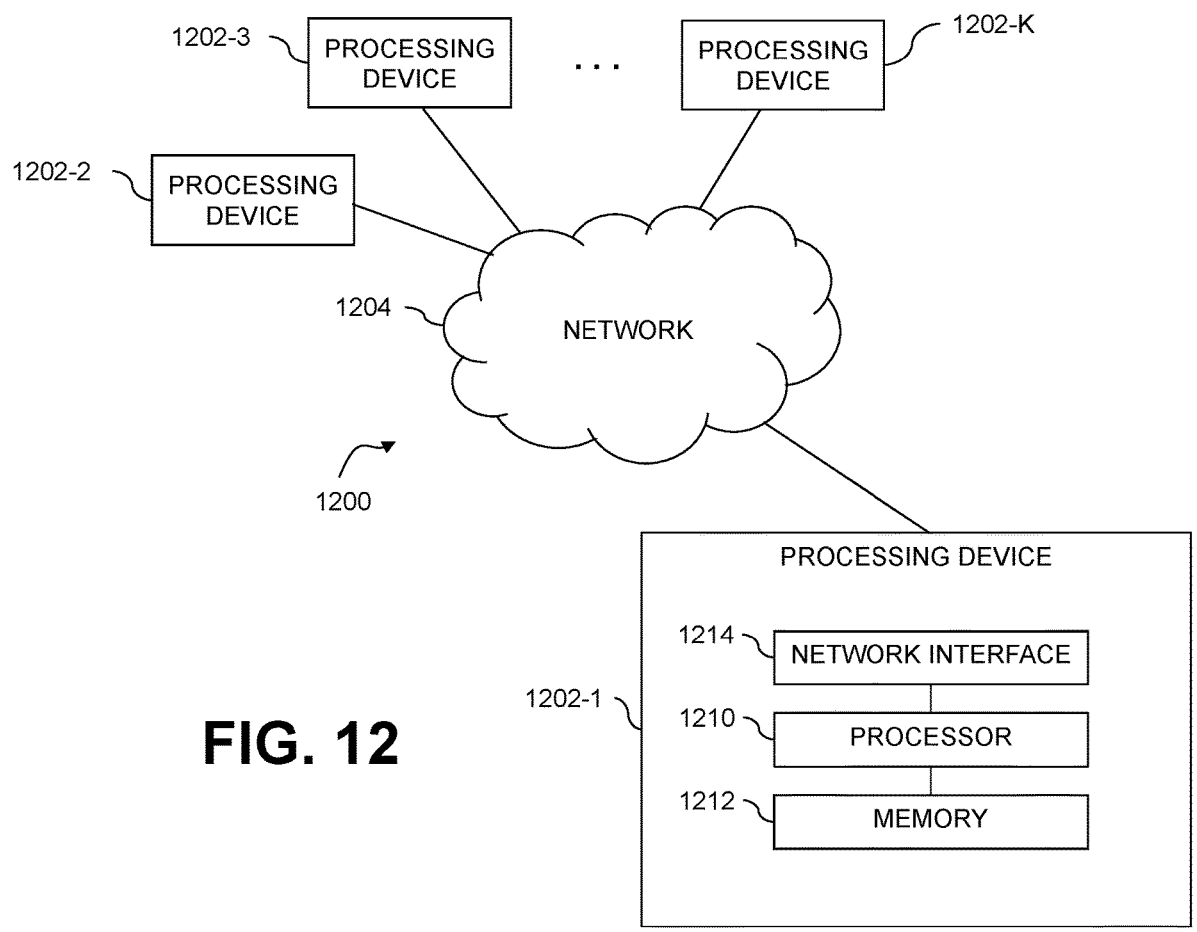

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for storage system IO throttling utilizing a reinforcement learning framework as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, IO throttling actions, IO throttling policies, reinforcement learning frameworks, and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to determine a current state of a storage system, the current state of the storage system comprising two or more input-output (IO) performance metric values for the storage system;
   to generate, utilizing a reinforcement learning framework, an IO throttling recommendation for the storage system based at least in part on the current state of the storage system;
   to apply the IO throttling recommendation to the storage system; and
   to update the reinforcement learning framework based at least in part on a subsequent state of the storage system following the application of the IO throttling recommendation to the storage system;
   wherein updating the reinforcement learning framework comprises generating a state-action record comprising at least current state, action, reward and subsequent state elements and utilizing the state-action record to update learned experience of the reinforcement learning framework, the learned experience comprising at least one action-value function of the reinforcement learning framework.

2. The apparatus of claim 1 wherein the two or more IO performance metric values for the storage system comprise at least IO operations per second (IOPS) and throughput.

3. The apparatus of claim 1 wherein the current state of the storage system is further characterized by a combination of storage system information, runtime performance information including the two or more IO performance metric values, and IO pattern combination information for a particular time period.

4. The apparatus of claim 1 wherein the state-action record comprises at least a tuple $(S_t, A_t, R_{t+1}, S_{t+1})$ and utilizing the state-action record to update learned experience of the reinforcement learning framework comprises utilizing the state-action record to update at least learned experience $Q(S_t, A_t)$ of the reinforcement learning framework, where $S_t$ denotes the current state, $A_t$ denotes a selected action of the IO throttling recommendation, $R_{t+1}$ denotes a reward for executing the selected action in the storage system, and $S_{t+1}$ denotes the subsequent state.

5. The apparatus of claim 1 wherein the determining, generating and updating are implemented in at least one of server and a host device that are external to the storage system, and applying the IO throttling recommendation to the storage system comprises sending an IO throttling action recommendation to the storage system in response to an IO throttling request received from the storage system.

6. The apparatus of claim 1 wherein the determining, generating, applying and updating are implemented within the storage system, and applying the IO throttling recommendation to the storage system comprises executing an IO throttling action recommendation within the storage system.

7. The apparatus of claim 1 wherein generating the IO throttling recommendation for the storage system comprises determining whether the current state of the storage system matches any of a plurality of state-action records of learned experience maintained by the reinforcement learning framework.

8. The apparatus of claim 7 wherein, responsive to determining that the current state of the storage system does not match any of the plurality of state-action records, randomly selecting an action from an action space, the action space defining a plurality of available IO throttling actions in accordance with an IO throttling policy.

9. The apparatus of claim 7 wherein, responsive to determining that the current state of the storage system matches a given one of the plurality of state-action records, utilizing a probability value of an exploitation and exploration tradeoff parameter to control performance of a particular one of at least first and second different action selections.

10. The apparatus of claim 9 wherein the first action selection comprises selecting a first action specified in the given one of the plurality of state-action records matching the current state of the storage system.

11. The apparatus of claim 9 wherein the second action selection comprises randomly selecting an action from an action space, the action space defining a plurality of available IO throttling actions in accordance with an IO throttling policy.

12. The apparatus of claim 1 wherein the reinforcement learning framework implements a reward function that is configured to control selection of actions that guide the storage system toward one or more specified performance goals.

13. The apparatus of claim 12 wherein the reward function is computed as a weighted combination of first and second functions based at least in part on respective ones of the first and second IO performance metric values.

14. The apparatus of claim 12 wherein the reward function is computed as a weighted combination of a first function indicative of an improvement in average latency relative to an initial latency and a second function indicative of an improvement in average throughput relative to an initial throughput.

15. A computer program product comprising a non-transitory processor-readable storage medium having stored therein program code of one or more software programs, wherein the program code when executed by at least one processing device causes the at least one processing device:
to determine a current state of a storage system, the current state of the storage system comprising two or more input-output (IO) performance metric values for the storage system;
to generate, utilizing a reinforcement learning framework, an IO throttling recommendation for the storage system based at least in part on the current state of the storage system;
to apply the IO throttling recommendation to the storage system; and
to update the reinforcement learning framework based at least in part on a subsequent state of the storage system following the application of the IO throttling recommendation to the storage system;
wherein updating the reinforcement learning framework comprises generating a state-action record comprising at least current state, action, reward and subsequent state elements and utilizing the state-action record to update learned experience of the reinforcement learning framework, the learned experience comprising at least one action-value function of the reinforcement learning framework.

16. The computer program product of claim 15 wherein the current state of the storage system is further characterized by a combination of storage system information, runtime performance information including the two or more IO performance metric values, and IO pattern combination information for a particular time period.

17. The computer program product of claim 15 wherein generating the IO throttling recommendation for the storage system comprises determining whether the current state of the storage system matches any of a plurality of state-action records of learned experience maintained by the reinforcement learning framework.

18. A method comprising:
determining a current state of a storage system, the current state of the storage system comprising two or more input-output (IO) performance metric values for the storage system;
generating, utilizing a reinforcement learning framework, an IO throttling recommendation for the storage system based at least in part on the current state of the storage system;
applying the IO throttling recommendation to the storage system; and
updating the reinforcement learning framework based at least in part on a subsequent state of the storage system following the application of the IO throttling recommendation to the storage system;
wherein updating the reinforcement learning framework comprises generating a state-action record comprising at least current state, action, reward and subsequent state elements and utilizing the state-action record to update learned experience of the reinforcement learning framework, the learned experience comprising at least one action-value function of the reinforcement learning framework; and
wherein the method is performed by at least one processing device comprising a processor coupled to a memory.

19. The method of claim 18 wherein the current state of the storage system is further characterized by a combination of storage system information, runtime performance information including the two or more IO performance metric values, and IO pattern combination information for a particular time period.

20. The method of claim 18 wherein generating the IO throttling recommendation for the storage system comprises determining whether the current state of the storage system matches any of a plurality of state-action records of learned experience maintained by the reinforcement learning framework.

* * * * *